(12) United States Patent
Hirakata et al.

(10) Patent No.: US 6,856,304 B1
(45) Date of Patent: Feb. 15, 2005

(54) LIQUID CRYSTAL PROJECTOR

(75) Inventors: Yoshiharu Hirakata, Kanagawa (JP); Keisuke Hayashi, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 09/234,005

(22) Filed: Jan. 19, 1999

(30) Foreign Application Priority Data

Jan. 21, 1998 (JP) .......................................... 10-023999

(51) Int. Cl.$^7$ ............................................. G09G 3/00
(52) U.S. Cl. ...................... 345/32; 345/87; 348/761; 359/495; 359/497
(58) Field of Search ............................ 353/31; 358/60; 359/40, 618, 486–501; 349/5, 6, 8, 95, 98; 345/22, 32, 87; 348/14, 751, 722, 758, 759, 761, 762, 766

(56) References Cited

U.S. PATENT DOCUMENTS

| | | | |
|---|---|---|---|
| 5,221,982 A | * 6/1993 | Faris | 359/93 |
| 5,267,029 A | * 11/1993 | Kurematsu et al. | 358/60 |
| 5,400,069 A | * 3/1995 | Braun et al. | 348/14.16 |
| 5,513,023 A | * 4/1996 | Fritz et al. | 359/40 |
| 5,534,748 A | * 7/1996 | Oomen | 313/479 |
| 5,555,186 A | * 9/1996 | Shioya | 359/40 |
| 5,566,367 A | * 10/1996 | Mitsutake et al. | 359/485 |
| 5,648,870 A | * 7/1997 | Mistutake | 359/487 |
| 5,682,180 A | * 10/1997 | Young et al. | 345/22 |
| 5,973,841 A | * 10/1999 | Watanabe | 353/98 |
| 5,978,136 A | * 11/1999 | Ogawa et al. | 359/487 |
| 6,081,378 A | * 6/2000 | Romano et al. | 359/497 |
| 6,120,152 A | * 9/2000 | Nakayama et al. | 353/31 |

OTHER PUBLICATIONS

Nakamori, T., "Liquid Crystal Projection Type Display Without Color Filter," Nikkei Electronics, 1.30, pp. 169–173, 1995.

Itoh, Y. et al, "Itra–High–Efficiency LC Projector Using a Polarized Light Illuminating System," SID Digest, pp. 993–996, 1997.

Katayama, T., "Progressing in High Resolution and High Aperture Ratio of High Temperature Poly–Si TFT," LCD Intelligence, 11, pp. 93–98, 1997.

Shieh, H.P.D. et al, "Optical Components for High–Throughput Projection Display," SID Digest, pp. 923–926, 1997.

* cited by examiner

Primary Examiner—Dennis-Doon Chow
(74) Attorney, Agent, or Firm—Cook, Alex, McFarron, Manzo, Cummings & Mehler, Ltd.

(57) ABSTRACT

A liquid crystal projector has a white light source, dichroic mirrors for separating white light coming from the white light source into beams of a plurality of colors, a liquid crystal panel having a number of pixels, microlens arrays for introducing the beams of the plurality of colors individually to apertures of the pixels of the liquid crystal panel, and a screen onto which the beams of the plurality of colors that have been modulated by the liquid crystal panel are projected. A micro-PBS array is disposed immediately before the incident side of the liquid crystal panel, and polarizes the beams of the plurality of colors into polarized beams that correspond to the respective pixels of the liquid crystal panel.

37 Claims, 6 Drawing Sheets

LIQUID CRYSTAL PROJECTOR

BACKGROUND OF THE INVENTION

1. Field of the Invention

The present invention relates to the configuration of an electro-optical display device, such as a projector using a liquid crystal panel and specifically to effective utilization of light in an optical system.

2. Description of the Related Art

In the field of electro-optical display devices, such as projectors using liquid crystal panels, there are techniques for effectively utilizing the light emitted from a light source.

One of those techniques is use of polarizing beam splitters (hereinafter referred to as PBSs). In conventional liquid crystal panels, polarizing plates are provided on the light incidence side and the light transmission side, respectively. The incidence-side polarizing plate transmits only a part of light incident on the liquid crystal panel which has a certain vibration plane and the other part of the incident light is not used. Therefore, the brightness of the liquid crystal panel depends on the transmittance of the incidence-side polarizing plate. The technique using PBSs intends to utilize the part of incident light that would otherwise be cut by the incidence-side polarizing plate. This technique will be outlined below with reference to FIGS. 2A and 2B.

Figure 2A:
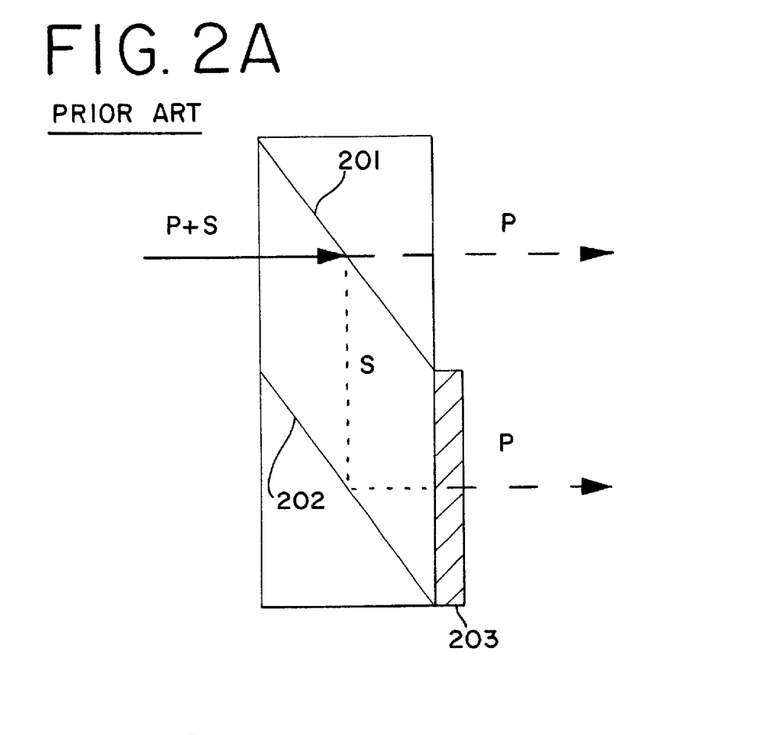
FIGS. 2A and 2B show a conventional optical system using a PBS array.
Figure 2B:
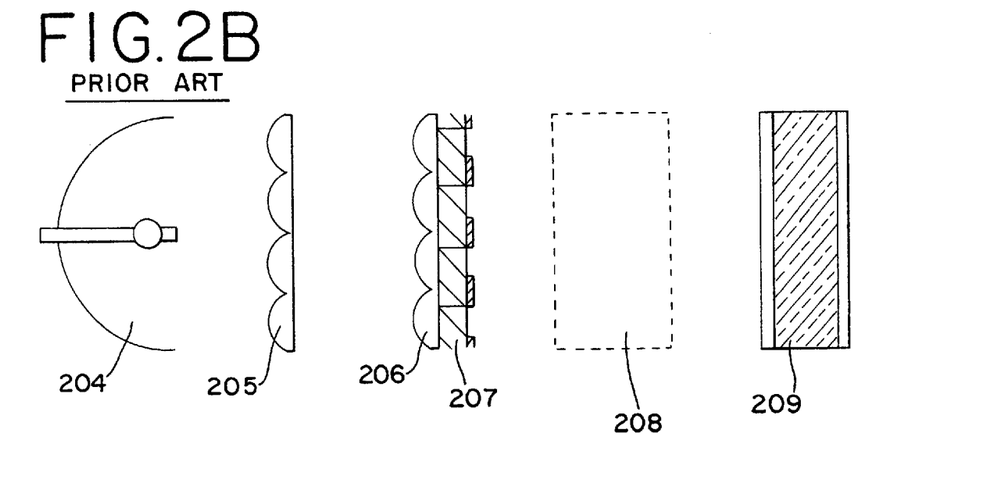

As shown in FIG. 2B, light (including P waves and S waves) that has been emitted from a light source 204 is transmitted through a first lens array 205 and a second lens array 206 and enters a PBS array 207. The PBS array 207 is an array of a plurality of PBS units each comprising two PBSs and one half-wave plate.

FIG. 2A is an enlarged view of the PBS unit. Light coming from the second lens array 206 enters the first PBS and is thereby separated into P waves and S waves. The P waves reach a liquid crystal panel 209 as they are via an optical system 208 such as lenses. On the other hand, the S waves are reflected by the first PBS and enter the second PBS. The S waves are again reflected by the second PBS and then converted by the half-wave plate into P waves, which reach the liquid crystal panel 209 via the optical system 208.

As described above, this technique enables effective utilization of light by utilizing almost all of incident light as extracted P waves through repeated transmission and reflection by the PBSs. The PBS array 207 consists of a number of PBS units each measuring several centimeters. Each PBS unit provides lights that are to be incident on tens of pixels.

To realize color display by using this technique, a three-panel configuration using three dichroic mirrors and three liquid crystal panels or a single-panel configuration using color filters and a single liquid crystal panel is employed.

However, in the three-panel configuration, the PBS array is provided immediately downstream of the light source and light that is outputted from the PBS array is applied to the liquid crystal panels via the dichroic mirrors. Because a complex optical system exists between the PBS array and the liquid crystal panels, phase deviations again occur in the optical paths between the PBS array and the liquid crystal panels. As a result, the quantity of light that can be used actually is reduced and, it cannot make good use of the PBS array. In addition, because of the use of three liquid crystal panels, the three-panel configuration has a disadvantage of a high manufacturing cost.

In the conventional single-panel configuration using color filters, since light beams of respective colors are obtained by using color filters for the respective pixels, theoretically the light quantity is reduced to one third ($1/3$) in a case where three color filters of, for example, red, green, and blue are used. Actually, because of an additional factor of the transmittance of the color filters, the light quantity obtained is about ($1/3$)×0.7 of the original quantity.

Another technique for effective utilization of light is a singlepanel configuration not using color filters. This technique will be described below briefly with reference to FIGS. 3A and 3B.

Figure 3A:
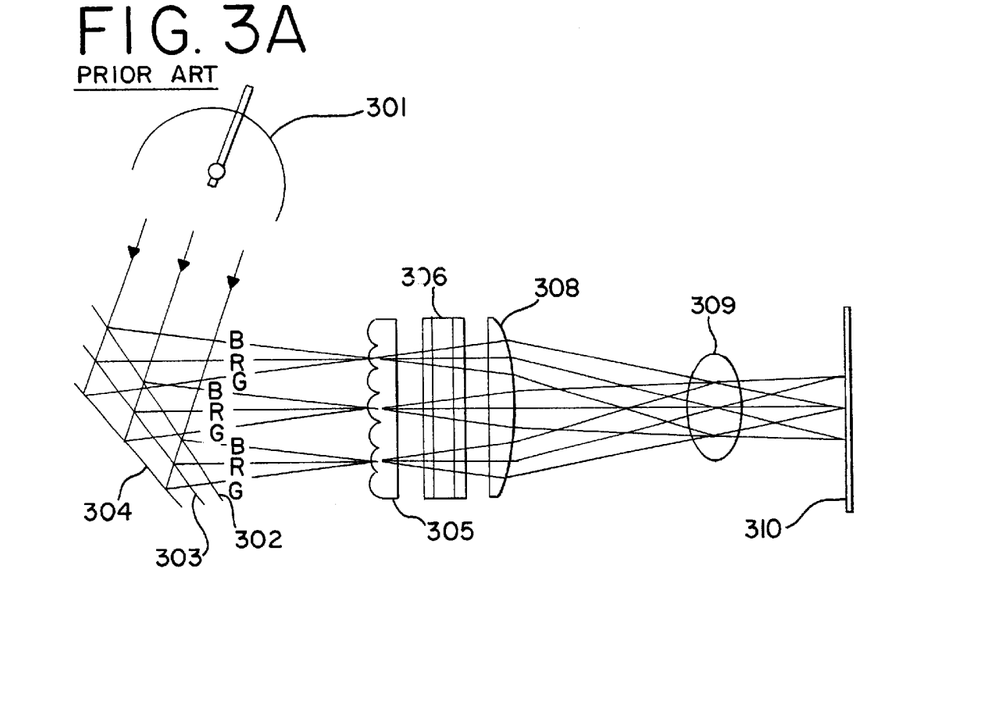
FIGS. 3A and 3B show an optical system of a conventional single-panel liquid crystal projector.

As shown in FIG. 3A, light emitted from a white light source 301 is separated into a blue beam (B), a red beam (R), and a green beam (G) by three dichroic mirrors 302–304. The separated beams reach a liquid crystal panel 306 via a microlens array 305.

Figure 3B:
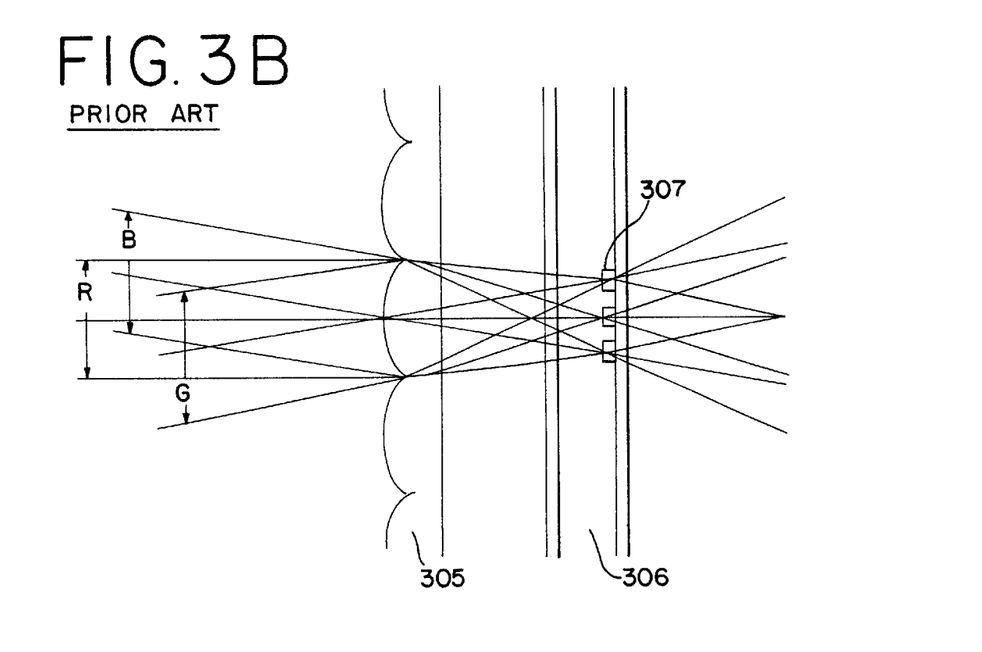

The separated beams enter apertures 310 of pixels corresponding to the respective beams as shown in FIG. 3B, enabling effective utilization of light. Further, since R, G, and B beams are generated from white light by the dichroic mirrors without using color filters, there is almost no loss of light.

As shown in FIG. 3A, light that has passed through the liquid crystal panel 306 reaches a screen 310 via a field lens 308 and a projection lens 309.

If the technique using PBSs is applied to the single-panel configuration not using color filters, the following problem occurs.

In the single-panel configuration not using color filters, beams of the respective colors are distributed to the corresponding pixels by the dichroic mirrors and the microlens array. However, in the technique using PBSs, each PBS unit can only produce light that enters tens of pixels. Therefore, to realize color display by combining the two techniques, the PBS array needs to be disposed between the white light source and the three dichroic mirrors.

In this configuration, a complex optical system exists in the optical path between the PBS array and the liquid crystal panel. Therefore, as pointed out above, phase deviations occur in the optical path between the PBS array and the liquid crystal panel, reducing the quantity of light that can be used actually. That is, there is a problem that the merit of the use of the PBS array cannot be exploited effectively.

SUMMARY OF THE INVENTION

An object of the present invention is to realize, by solving the above problems, a liquid crystal projector which utilizes light at very high efficiency.

The invention provides a liquid crystal projector comprising a white light source for producing white light; means for separating the white light from the light source into beams of a plurality of colors; a liquid crystal panel having a plurality of pixels; optical means for introducing each beam of the plurality of colors to apertures of the pixels of the liquid crystal panel for the respectively colors individually; means for projecting beams of the plurality of colors that have been modulated by the liquid crystal panel; and means for polarizing the beams of the plurality of colors, the polarizing means disposed immediately before an incident side of the liquid crystal panel, so as to correspond to the respective pixels of the liquid crystal panel.

In the above liquid crystal projector, the plurality of colors may be red, green, and blue.

Further, in the above liquid crystal projector, the polarizing means may be an array of a plurality of units each comprising two polarizing beam splitters and one half-wave plate.

Also, the above liquid crystal projector may further comprise a light absorption layer provided between adjacent ones of the plurality of units.

Further, in the liquid crystal projector, each unit may be configured in such a manner that the first and second polarizing beam splitters are arranged adjacent to each other and one polarizing beam splitter is disposed on the side of a thin-film transistor in the corresponding pixel and the other one polarizing beam splitter is not located on the side of the thin-film transistor, respectively, and that the half-wave plate is disposed on the side of the one polarizing beam splitter.

Further, in the above liquid crystal projector, the optical means may comprise first optical means for distributing the beams of the plurality of colors for the respective colors while converging the beams; and second optical means for converting divergent beams that are outputted from the first optical means into parallel beams that are directed to the apertures of the respective pixels.

According to another aspect of the invention, there is provided a liquid crystal projector comprising a white light source; a plurality of dichroic mirrors; a liquid crystal panel having a plurality of pixels; a screen; a microlens array disposed between the plurality of dichroic mirrors and the liquid crystal panel on an optical path along which light emitted from the white light source is projected onto the screen via the plurality of dichroic mirrors and the liquid crystal panel; and a micro-polarizing beam splitter array disposed between the microlens array and the liquid crystal panel on the optical path.

As described above, since each polarizing means, that is, each micro-polarizing beam splitter unit corresponding to one pixel of the liquid crystal panel, separated beams can be polarized individually into polarized beams that correspond to respective pixels.

The polarizing means can be disposed immediately in front of the liquid crystal panel; that is, the micro-polarizing beam splitter array can be disposed between the microlens array and the liquid crystal panel. Since there is no component that shifts the phase between the polarizing means (micro-polarizing beam splitter array) and the liquid crystal panel, effective utilization of light becomes possible.

DETAILED DESCRIPTION OF THE PREFERRED EMBODIMENTS

Embodiment 1

Figure 1A:
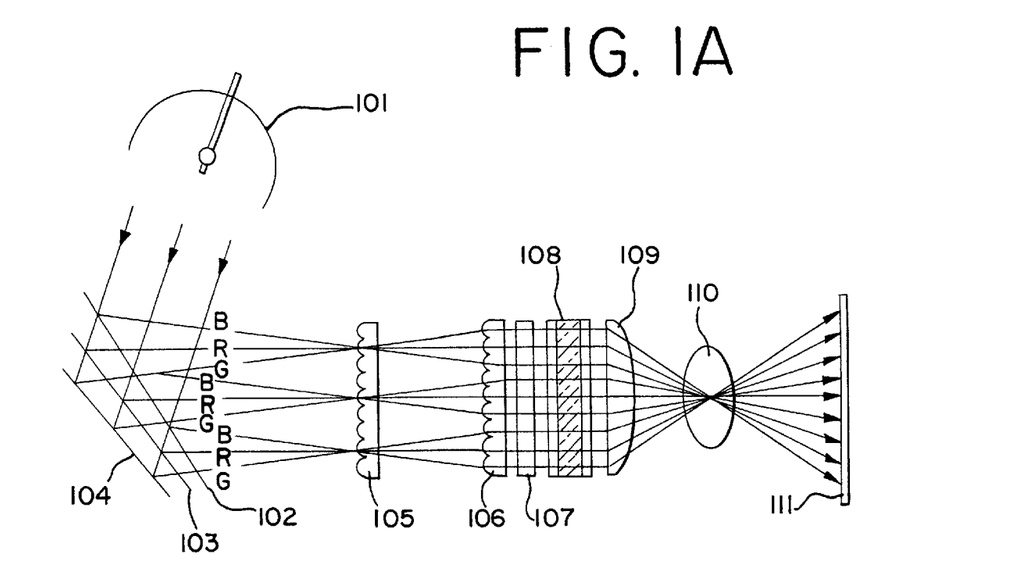
FIGS. 1A and 1B show an optical system of a liquid crystal projector according to a first embodiment of the present invention.
Figure 1B:
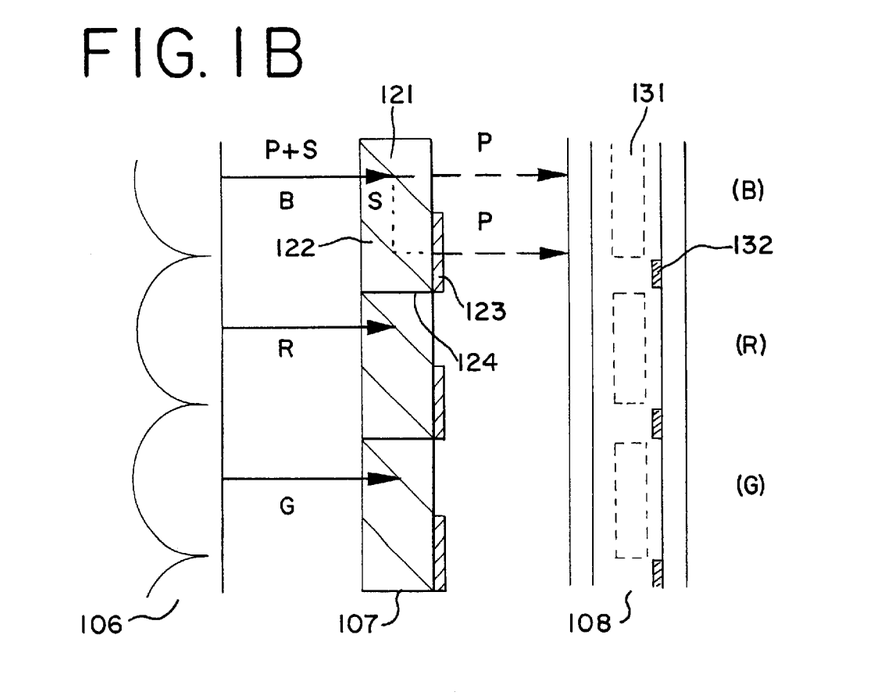

FIGS. 1A and 1B show the configuration of an optical system of a liquid crystal projector according to this embodiment. As shown in FIG. 1A, white light emitted from a white light source 101 is separated into a blue beam (B), a red beam (R), and a green beam (G) by dichroic mirrors 102–104. The three dichroic mirrors 102–104 are not parallel with each other and at certain angles with each other.

The separated beams are made parallel with each other by a first microlens array 105 and a second microlens array 106 and then enter micro-PBS array 107. Although the two microlens arrays 105 and 106 are used in this embodiment, three microlens arrays may be used to make the separated beams more parallel. Naturally, it is possible to use only one microlens array.

As shown in FIG. 1B, the micro-PBS array 107 is an array of a number of PBS units, each comprising a first micro-PBS 121, a second micro-PBS 122, and a half-wave plate 123.

The length and the arrangement of the micro-PBS units are so set that light that is outputted from one micro-PBS unit enters the aperture of one pixel of a liquid crystal panel 108. That is, the length of one micro-PBS unit is equal to that of the aperture of one pixel.

Where the first micro-PBS 121 separates P waves and S waves at a ratio of 1:1 from the incident light, it is preferable that light that is outputted from the first micro-PBS 121 (i.e., the micro-PBS that is not adjacent to the half-wave plate 123) enter a pixel portion on the side away from a TFT 132, for the following reason. Light entering an aperture portion on the side away from the TFT 132 thereafter encounters no obstacle and hence is transmitted efficiently. Light that has passed through the half-wave plate 123 is attenuated by the half5 wave plate 123 because its transmittance is not 100%. Therefore, in terms of the effective utilization of light, it is more efficient to introduce the light that has not passed through the half-wave plate 123 to the aperture portion on the side away from the TFT 132.

A light absorption layer 124 is provided between micro-PBS units adjacent to each other. This is to shield each micro-PBS unit from light beams of different colors leaking from the micro-PBS units adjacent thereto. This structure prevents mixing of light beams of different colors.

In each micro-PBS unit, the second micro-PBS 122 may be replaced by a full-reflection mirror.

Light beams that are outputted from the second microlens array 106 enter the respective first micro-PBSs 121. That is, the microlenses of the second microlens array 106 correspond to the respective micro-PBS units. The first microlens array 105 and the second microlens array 106 are so arranged as to supply light beams to the first micro-PBSs 121.

Light entering the first micro-PBS 121 is separated into P waves and S waves. The P waves reach the liquid crystal panel 108 as they are. On the other hand, the S waves are reflected by the first micro-PBS 121 and enter the second micro-PBS 122. The S waves are again reflected by the second micro-PBS 122 and then converted (changed in phase) into P waves in passing through the half-wave plate 123. The resulting P waves reach the liquid crystal panel 108.

In this manner, the separated blue (B), red (R), and green (G) beams that correspond to the respective pixels are individually polarized into P waves and enter the respective pixels. Light beams that have passed through the liquid crystal panel 108 are converged by a field lens 109, then diffused by a projection lens 110, and finally projected onto a screen 111.

Although in this embodiment the half-wave plate 123 is provided on the side of the second micro-PBS 122, it may be provided on the side of the first micro-PBS 121. In this case, in terms of the effective utilization of light, it is more efficient to dispose the micro-PBS array 107 so that light that is outputted from the second micro-PBS 122 enters a pixel portion on the side away from the TFT 132.

Figure 4:
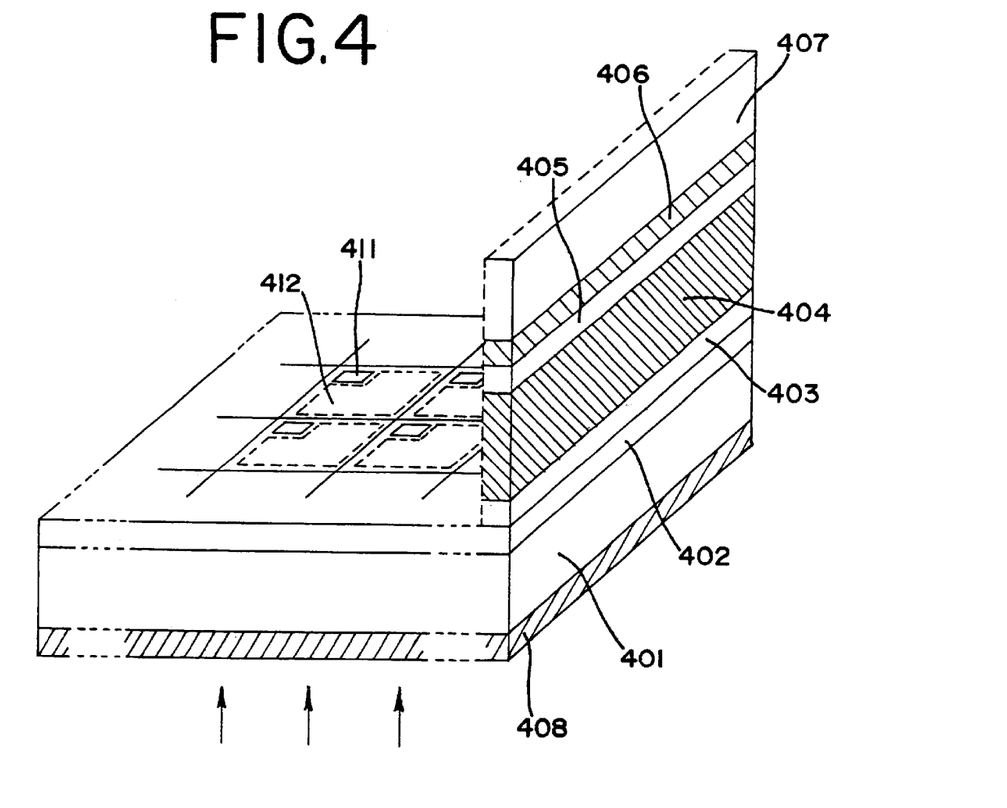
FIG. 4 is a partially cutaway perspective view of a liquid crystal panel used in the second embodiment.

FIG. 4 is a partially cutaway perspective view of the liquid crystal panel 108 used in this embodiment and shows the structure of a pixel matrix. As shown in FIG. 4, light incident on a glass substrate 401 passes through apertures 412 of a TFT array 402 and does not enter TFTs 411. Then, the light sequentially passes through an alignment film 403, a liquid crystal layer 404, an alignment film 405, an opposed electrode 406, a glass substrate 407, and a polarizing plate 408.

In this embodiment, each pixel measures 20 μm×20 μm to 40 μm×40 μm, and hence the length of each micro-PBS unit is 20–40 μm and the length of each micro-PBS is 10–20 μm.

As described above, neither color filters nor a polarizing plate for polarizing incident light is used. Therefore, the light emitted from the light source 101 can be utilized effectively.

With the above configuration in which the micro-PBS units correspond to the respective pixels, light beams of the respective colors can be polarized individually and hence the micro-PBS array 107 can be disposed immediately in front of the liquid crystal panel 108. Since there exists no component that shifts the phase between the micro-PBS array 107 and the liquid crystal panel 108, more effective utilization of light becomes possible than in the conventional cases.

Embodiment 2

Figure 5A:
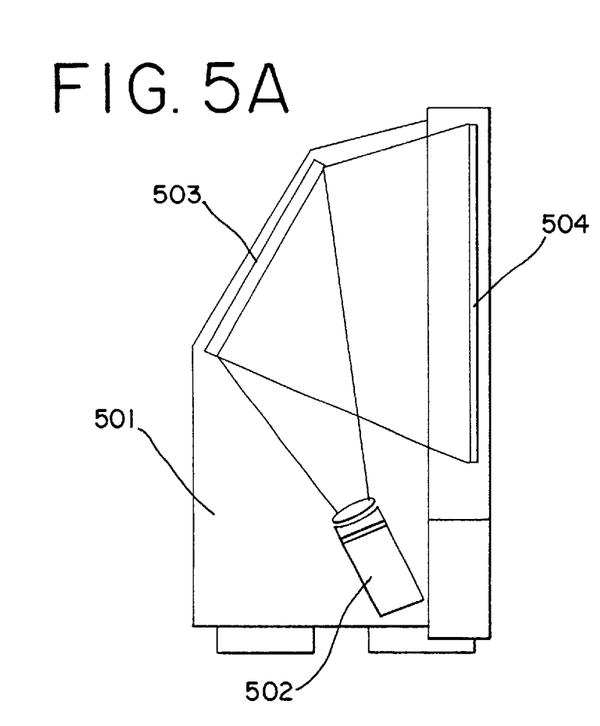
FIGS. 5A and 5B show the configuration of a rear projector according to a second embodiment of the invention.
Figure 5B:
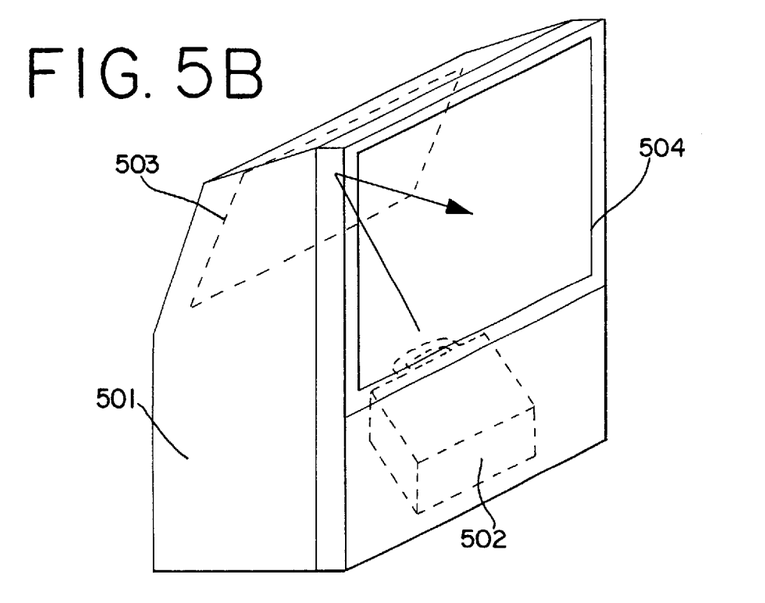

This embodiment is directed to a rear projector that incorporates the liquid crystal projector of the invention. FIG. 5A is a side view of a rear projector of this embodiment and shows its internal structure in a simplified manner. FIG. 5B is a perspective view of the rear projector.

In FIGS. 5A and 5B, reference numeral 501 denotes a main body; 502, an optical engine; 503, a reflector; and 504, a screen. This embodiment describes a general configuration; actually, the rear projector has other optical systems and is more complex in configuration. The liquid crystal projector of the invention is used in the optical engine 502, whereby the rear projector is given with high screen brightness.

By integrating semiconductor circuits with the liquid crystal panel used in the invention, the rear projector is enabled to deal with a signal of any of the NTSC system, the PAL system, and the digital system.

Even if a video signal corresponds to different resolutions such as those of XGA, SXGA, and UXGA, the rear projector can produce high-contrast pictures while preventing reduction in resolution by taking a proper measure such as performing black display for unnecessary portions (where no image is displayed) by means of logic circuits or the like.

Embodiment 3

Figure 6:
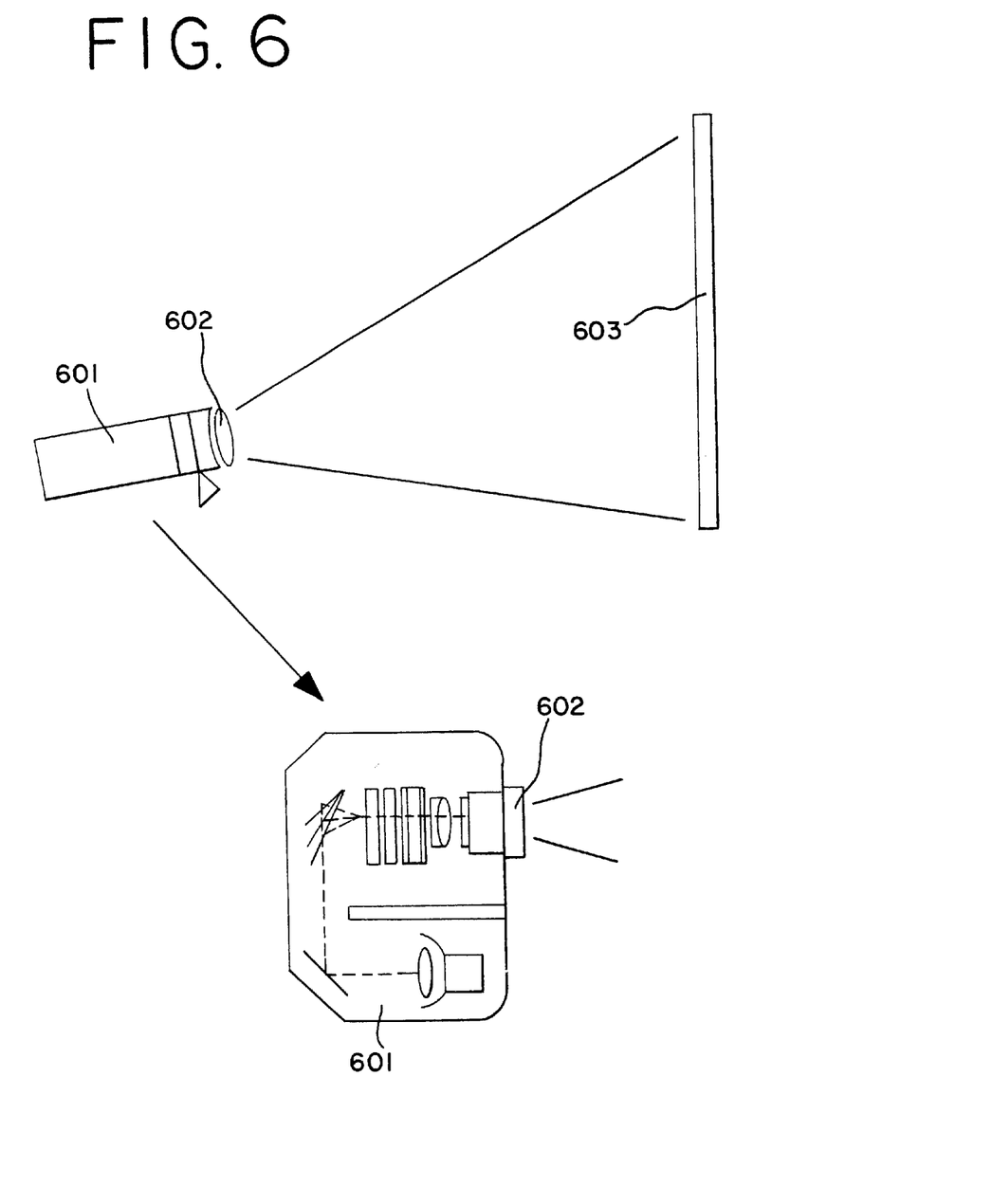
FIG. 6 shows the configuration of a front projector according to a third embodiment of the invention.

This embodiment is directed to a front projector that incorporates the optical system of the invention. FIG. 6 shows the configuration of a front projector according to this embodiment. In FIG. 6, reference numerals 601–603 denote a projection main body, a projector lens, and a screen, respectively.

The projection main body 601 incorporates the optical system of the invention. Light carrying video information is outputted from the projection main body 601 and projected onto the screen 603 by the projection lens 602. In this manner, the front projector is given with high screen brightness.

The most important feature of front projectors is that pictures are displayed on a large-sized screen. Therefore, there is a great demand for front projectors for conference and presentation purposes. While front projectors having screen diagonal sizes of 1–2.5 m are commonly used, front projectors having even larger screen sizes can also be used.

The single-panel liquid crystal projector of the invention, though it is a color projector, enables the light emitted from a light source to be utilized at very high efficiency. The liquid crystal projector of the invention can thus produce very bright color pictures.

What is claimed is:

1. A liquid crystal projector comprising:

a light source for irradiating white light;

means for separating the white light into beams of a plurality of colors;

a liquid crystal panel having a plurality of pixels;

means for polarizing the beams of the plurality of colors disposed before an incident side of the liquid crystal panel, wherein the means for polarizing comprises a plurality of units and each of the units corresponds to the respective pixels of the liquid crystal panel;

optical means for converting the beams of the plurality of the colors into parallel beams and for introducing the beams of the plurality of colors, for the respective colors individually, to each of the pixels of the liquid crystal panel through the respective units of the means for polarizing;

means for projecting beams of the plurality of colors that have been modulated by the liquid crystal panel; and a light absorption layer provided between adjacent ones of the plurality of units, wherein each of the units comprises first and second polarizing beam splitters and one half-wave plate.

2. A liquid crystal projector according to claim 1, wherein the plurality of colors are red, green and blue.

3. A liquid crystal projector according to claim 1, wherein each of the units comprises first and second polarizing beam splitters and one half-wave plate.

4. A liquid crystal projector according to claim 1, wherein the optical means comprises:

first optical means for converging the beams of the plurality of colors for the respective colors individually and distributing the converged beams so as to correspond the pixels of the liquid crystal panel; and second optical means for converting beams that are outputted from the first optical means into parallel beams that are directed to the respective pixels.

5. A liquid crystal projector according to claim 1, wherein the projector is a rear-type projector.

6. A liquid crystal projector according to claim 1, wherein the projector is a front-type projector.

7. A liquid crystal projector comprising:

a light source for irradiating white light;

means for separating the white light into beams of a plurality of colors;

a liquid crystal panel having a plurality of pixels;

means for polarizing the beams of the plurality of colors disposed before an incident side of the liquid crystal panel, wherein the means for polarizing comprises a plurality of units and each of the units corresponds to the respective pixels of the liquid crystal panel;

optical means for converting the beams of the plurality of the colors into parallel beams and for introducing the beams of the plurality of colors, for the respective colors individually, to each of the pixels of the liquid crystal panel through the respective units of the means for polarizing; and means for projecting beams of the plurality of colors that have been modulated by the liquid crystal panel, wherein each of the units comprises first and second polarizing beam splitters and one half-wave plate, and wherein the first and second polarizing beam splitters are arranged adjacent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

8. An electro-optical display device comprising:

a light source;

a plurality of dichroic mirrors for separating a plurality of colors from the light source;

a liquid crystal panel having a plurality of pixels;

a screen;

a micro-polarizing beam splitter array disposed between the liquid crystal panel and the microlens array on the optical path; and means for distributing each of beams of the plurality of colors and for converting the distributed beams into parallel beams, wherein the micro-polarizing beam splitter array comprises a plurality of micro-polarizing beam splitter units, each of which corresponds to the respective pixels of the liquid crystal panel, and wherein the micro-polarizing beam splitter array comprises light absorption layers disposed between the plurality of units.

9. A device according to claim 8 wherein each of the units comprises first and second polarizing beam splitters and one half-wave plate.

10. A device according to claim 8, wherein the electro-optical display device is a rear-type projector.

11. A device according to claim 8, wherein the electro-optical display device is a front-type projector.

12. An electro-optical device comprising:

a light source irradiating light;

a plurality of dichroic mirrors for separating the light from the light source into beams of a plurality of colors;

microlens arrays for distributing each of the beams of the plurality of colors and for converting the distributed beams into parallel beams;

a micro-polarizing beam splitter array;

a liquid crystal panel having a plurality of pixels; and a screen, wherein the micro-polarizing beam splitter array is disposed before the liquid crystal panel and the micro-polarizing beam splitter array comprises a plurality of micro-polarizing beam splitter units, each of which corresponds to the respective pixels of the liquid crystal panel, and wherein the micro-polarizing beam splitter array comprises light absorption layers disposed between the plurality of units.

13. A device according to claim 12 wherein each of the units comprises first and second polarizing beam splitters and one half-wave plate.

14. A device according to claim 12, wherein the microlens arrays comprises first and second microlens arrays, which are disposed between the dichroic mirrors and the micro-polarizing beam splitter array.

15. A device according to claim 12, wherein the electro-optical display device is a rear-type projector.

16. A device according to claim 12, wherein the electro-optical display device is a front-type projector.

17. A liquid crystal projector comprising:

a light source for irradiating white light;

means for separating the white light into beams of a plurality of colors;

a liquid crystal panel having a plurality of pixels;

means for polarizing the beams of the plurality of colors disposed before an incident side of the liquid crystal panel, wherein the means for polarizing comprises a plurality of units and each of the units corresponds to the respective pixels of the liquid crystal panel;

optical means for converting the beams of the plurality of the colors into parallel beams and for introducing the beams of the plurality of colors, for the respective colors individually, to each of the pixels of the liquid crystal panel through the respective units of the means for polarizing; and means for projecting beams of the plurality of colors that have been modulated by the liquid crystal panel, wherein a length of each of the units is equal to a length of an aperture of the respective pixels.

18. An electro-optical display device comprising a light source;

a plurality of dichroic mirrors for separating a plurality of colors from the light source;

a liquid crystal panel having a plurality of pixels;

a screen;

a micro-polarizing beam splitter array disposed between the liquid crystal panel and the microlens array on the optical path; and means for distributing each of beams of the plurality of colors and for converting the distributed beams into parallel beams;

wherein the micro-polarizing beam splitter array comprises a plurality of micro-polarizing beam splitter units, each of which corresponds to the respective pixels of the liquid crystal panel, and wherein a length of each of the units is equal to a length of an aperture of the respective pixels.

19. An electro-optical device comprising:

a light source irradiating light;

a plurality of dichroic mirrors for separating the light from the light source into beams of a plurality of colors;

microlens arrays for distributing each of the beams of the plurality of colors and for converting the distributed beams into parallel beams;

a micro-polarizing beam splitter array;

a liquid crystal panel having a plurality of pixels; and a screen, wherein the micro-polarizing beam splitter array is disposed before the liquid crystal panel and the micro-polarizing beam splitter array comprises a plurality of micro-polarizing beam splitter units, each of which corresponds to the respective pixels of the liquid crystal panel, and wherein a length of each of the units is equal to a length of an aperture of the respective pixels.

20. An electro-optical display device comprising:

a light source;

a plurality of dichroic mirrors for separating a plurality of colors from the light source;

a liquid crystal panel having a plurality of pixels;

a screen;

a micro-polarizing beam splitter array disposed between the liquid crystal panel and the microlens array on the optical path; and means for distributing each of beams of the plurality of colors and for converting the distributed beams into parallel beams, wherein the micro-polarizing beam splitter array comprises a plurality of micro-polarizing beam splitter units, each of which corresponds to the respective pixels of the liquid crystal panel, wherein each of the units comprise first and second polarizing beam splitters and one half-wave plate, and wherein the first and second polarizing beam splitters are arranged adj acent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

21. An electro-optical device comprising a light source irradiating light;

a plurality of dichroic mirrors for separating the light from the light source into beams of a plurality of colors;

microlens arrays for distributing each of the beams of the plurality of colors and for converting the distributed beams into parallel beams;

a micro-polarizing beam splitter array;

a liquid crystal panel having a plurality of pixels; and a screen, wherein the micro-polarizing beam splitter array is disposed before the liquid crystal panel and the micro-polarizing beam splitter array comprises a plurality of micro-polarizing beam splitter units, each of which corresponds to the respective pixels of the liquid crystal panel, wherein each of the units comprise first and second polarizing beam splitters and one half-wave plate, and wherein the first and second polarizing beam splitters are arranged adj acent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

22. A projector comprising:

a light source for irradiating white light;

means for separating the white light into beams of a plurality of colors;

a liquid crystal panel having a plurality of pixels;

means for polarizing the beams of the plurality of colors disposed before an incident side of the liquid crystal panel, wherein the means for polarizing comprises a plurality of units and each of the units corresponds to the respective pixels of the liquid crystal panel;

optical means for introducing the beams of the plurality of colors, for the respective colors individually, to each of the pixels of the liquid crystal panel through the respective units constituting the means for polarizing;

means for projecting beams of the plurality of colors that have been modulated by the liquid crystal panel; and a light absorption layer provided between adjacent ones of the plurality of units, wherein each of the units comprises first and second polarizing beam splitters and one half-wave plate, and wherein each of the units comprises first and second polarizing beam splitters and one half-wave plate.

23. A projector according to claim 22, wherein each of the units comprises first and second polarizing beam splitters and one half-wave plate.

24. A projector comprising a light source for irradiating white light;

means for separating the white light into beams of a plurality of colors;

a liquid crystal panel having a plurality of pixels;

means for polarizing the beams of the plurality of colors disposed before an incident side of the liquid crystal panel, wherein the means for polarizing comprises a plurality of units and each of the units corresponds to the respective pixels of the liquid crystal panel;

optical means for introducing the beams of the plurality of colors, for the respective colors individually, to each of the pixels of the liquid crystal panel through the respective units constituting the means for polarizing; and means for projecting beams of the plurality of colors that have been modulated by the liquid crystal panel, wherein each of the units comprises first and second polarizing beam splitters and one half-wave plate, and wherein the first and second polarizing beam splitters are arranged adjacent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

25. A projector comprising:

a light source for irradiating white light;

means for separating the white light into beams of a plurality of colors;

a liquid crystal panel having a plurality of pixels;

means for polarizing the beams of the plurality of colors disposed before an incident side of the liquid crystal panel, wherein the means for polarizing comprises a plurality of units and each of the units corresponds to the respective pixels of the liquid crystal panel;

optical means for introducing the beams of the plurality of colors, for the respective colors individually, to each of the pixels of the liquid crystal panel through the respective units constituting the means for polarizing; and means for projecting beams of the plurality of colors that have been modulated by the liquid crystal panel, wherein a length of each of the units is equal to a length of an aperture of the respective pixels.

26. A projector comprising:

a light source;

a plurality of dichroic mirrors for converting beams from the light source into parallel beams;

a liquid crystal panel having a plurality of pixels;

a screen;

microlens array disposed between the plurality of dichroic mirrors and the liquid crystal panel on an optical path along which light emitted from the white light source is projected onto the screen via the plurality of dichroic mirrors and the liquid crystal panel;

a micro-polarizing beam splitter array comprising a plurality of the micro-polarizing beam splitter units, each of which corresponds to the respective pixels of the liquid crystal panel; and a light absorption layer provided between adjacent ones of the plurality of units, wherein each of the units comprises first and second polarizing beam splitters and one half-wave plate.

27. A projector according to claim 26, wherein each of the units comprises first and second polarizing beam splitters and one half-wave plate.

28. A projector comprising:

a light source;

a plurality of dichroic mirrors for converting beams from the light source into parallel beams;

a liquid crystal panel having a plurality of pixels;

a screen;

microlens array disposed between the plurality of dichroic mirrors and the liquid crystal panel on an optical path along which light emitted from the white light source is projected onto the screen via the plurality of dichroic mirrors and the liquid crystal panel; and a micro-polarizing beam splitter array comprising a plurality of the micro-polarizing beam splitter units, each of which corresponds to the respective pixels of the liquid crystal panel, wherein each of the units comprises first and second polarizing beam splitters and one half-wave, and wherein the first and second polarizing beam splitters are arranged adj acent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

29. A projector comprising:

a light source;

a plurality of dichroic mirrors for converting beams from the light source into parallel beams;

a liquid crystal panel having a plurality of pixels;

a screen;

microlens array disposed between the plurality of dichroic mirrors and the liquid crystal panel on an optical path along which light emitted from the white light source is projected onto the screen via the plurality of dichroic mirrors and the liquid crystal panel; and a micro-polarizing beam splitter array comprising a plurality of the micro-polarizing beam splitter units, each of which corresponds to the respective pixels of the liquid crystal panel, wherein a length of each of the units is equal to a length of an aperture of the respective pixels.

30. A projector comprising:

a light source irradiating light;

a plurality of dichroic mirrors for separating the light from the light source into beams of a plurality of colors;

microlens arrays for distributing each of the beams of the plurality of colors and for converting the distributed beams into parallel beams;

a micro-polarizing beam splitter array;

a liquid crystal panel having a plurality of pixels;

a screen; and a light absorption layer provided between adjacent ones of the plurality of units, wherein the micro-polarizing beam splitter array comprises a plurality of the micro-polarizing beam splitter units, each of which corresponds to the respective pixels of the liquid crystal panel, and wherein each of the units comprises first and second polarizing beam splitters and one half-wave plate.

31. A projector according to claim 30, wherein each of the units comprises first and second polarizing beam splitters and one half-wave plate.

32. A projector comprising:

a light source irradiating light;

a plurality of dichroic mirrors for separating the light from the light source into beams of a plurality of colors;

microlens arrays for distributing each of the beams of the plurality of colors and for converting the distributed beams into parallel beams;

a micro-polarizing beam splitter array;

a liquid crystal panel having a plurality of pixels; and a screen, wherein the micro-polarizing beam splitter array comprises a plurality of the micro-polarizing beam splitter units, each of which corresponds to the respective pixels of the liquid crystal panel, wherein each of the units comprises first and second polarizing beam splitters and one half-wave plate, and wherein the first and second polarizing beam splitters are arranged adjacent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

33. A projector comprising:

a light source irradiating light;

a plurality of dichroic mirrors for separating the light from the light source into beams of a plurality of colors;

microlens arrays for distributing each of the beams of the plurality of colors and for converting the distributed beams into parallel beams;

a micro-polarizing beam splitter array;

a liquid crystal panel having a plurality of pixels; and a screen, wherein the micro-polarizing beam splitter array comprises a plurality of the micro-polarizing beam splitter units, each of which corresponds to the respective pixels of the liquid crystal panel, and wherein a length of each of the units is equal to a length of an aperture of the respective pixels.

34. A projector comprising:

a light source for irradiating white light;

a liquid crystal panel having a plurality of pixels;

means for projecting beams of a plurality of colors that have been modulated by the liquid crystal panel;

means for polarizing the beams of the plurality of colors comprising a plurality ofunits, each of which corresponds to the respective pixels of the liquid crystal panel; and a light absorption layer provided between adjacent ones of the plurality of units, wherein each of the units comprises first and second polarizing beam splitters and one half-wave plate.

35. A projector according to claim 34, wherein each of the units comprises first and second polarizing beam splitters and one half-wave plate.

36. A projector comprising:

a light source for irradiating white light;

a liquid crystal panel having a plurality of pixels;

means for projecting beams of a plurality of colors that have been modulated by the liquid crystal panel; and means for polarizing the beams of the plurality of colors comprising a plurality ofunits, each of which corresponds to the respective pixels of the liquid crystal panel, wherein each of the units comprises first and second polarizing beam splitters and one half-wave plate, and wherein the first and second polarizing beam splitters are arranged adjacent to each other and one of the polarizing beam splitters is disposed on a side of a thin-film transistor in the corresponding pixel and the other one of the polarizing beam splitters is disposed apart from the thin-film transistor, respectively, and wherein the half-wave plate is disposed on the side of the one of the polarizing beam splitters.

37. A projector comprising:

a light source for irradiating white light;

a liquid crystal panel having a plurality of pixels;

means for projecting beams of a plurality of colors that have been modulated by the liquid crystal panel; and means for polarizing the beams of the plurality of colors comprising a plurality of units, each of which corresponds to the respective pixels of the liquid crystal panel, wherein a length of each of the units is equal to a length of an aperture of the respective pixels.

* * * * *